United States Patent
Gude et al.

(10) Patent No.: US 9,131,475 B2
(45) Date of Patent: Sep. 8, 2015

(54) FAST ACQUISITION IN MULTI-SUBSCRIBER IDENTITY MODULE (SIM) DEVICES

(71) Applicant: QUALCOMM Incorporated, San Diego, CA (US)

(72) Inventors: Venkata Siva Prasad Rao Gude, Andhra Pradesh (IN); Debesh Kumar Sahu, Hyderabad (IN); Venkata Appala Naidu Babbadi, Andhra Pradesh (IN); Venkata Girish Vadlamudi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/928,609

(22) Filed: Jun. 27, 2013

(65) Prior Publication Data

US 2015/0004973 A1 Jan. 1, 2015

(51) Int. Cl.
*H04W 4/00* (2009.01)
*H04W 76/02* (2009.01)
*H04W 48/16* (2009.01)
*H04W 48/18* (2009.01)
*H04W 52/02* (2009.01)
*H04W 88/06* (2009.01)

(52) U.S. Cl.
CPC ............ *H04W 76/025* (2013.01); *H04W 48/16* (2013.01); *H04W 52/0216* (2013.01); *H04W 48/18* (2013.01); *H04W 52/0241* (2013.01); *H04W 88/06* (2013.01)

(58) Field of Classification Search
USPC ............. 455/435.2, 435.1, 417, 404.1, 550.1, 455/410
See application file for complete search history.

(56) References Cited

U.S. PATENT DOCUMENTS

| 2012/0190362 | A1 | 7/2012 | Subbarayudu et al. | |
| 2012/0289193 | A1* | 11/2012 | Bergenwall | 455/410 |
| 2013/0005290 | A1 | 1/2013 | Geary et al. | |
| 2013/0005291 | A1* | 1/2013 | Geary et al. | 455/404.1 |
| 2014/0024353 | A1* | 1/2014 | Baek et al. | 455/417 |
| 2014/0038601 | A1* | 2/2014 | Gouriou et al. | 455/435.1 |
| 2014/0323175 | A1* | 10/2014 | Shah | 455/550.1 |

FOREIGN PATENT DOCUMENTS

EP 2472973 A1 7/2012

OTHER PUBLICATIONS

International Search Report and Written Opinion—PCT/US2014/041442—ISA/EPO—Dec. 23, 2014.

\* cited by examiner

*Primary Examiner* — David Q Nguyen
(74) *Attorney, Agent, or Firm* — The Marbury Law Group, PLLC

(57) ABSTRACT

A method and apparatus configured to perform fast acquisition in multi-subscription multi-active devices are described. The apparatus may establish a first traffic call associated with a first subscription using a first radio frequency chain and a second traffic call associated with a second subscription using a second radio frequency chain. A subscription corresponding to a third subscription may enter an out-of-service mode when the first and second traffic calls are established. A first network may be acquired for the first subscription using the first RF chain after the first traffic call is terminated. The third subscription may be transitioned from out-of-service mode to idle mode using acquisition information inherited from the subscription corresponding to the first SIM after the first network is acquired. The third subscription and the first network may be associated with a same radio access technology and a same network operator.

38 Claims, 9 Drawing Sheets

FAST ACQUISITION IN MULTI-SUBSCRIBER IDENTITY MODULE (SIM) DEVICES

BACKGROUND

1. Field

Aspects of the present disclosure relate generally to wireless communication systems, and more particularly to wireless terminals that support multiple subscriptions using multiple transceivers.

2. Background

Wireless communication networks are widely deployed to provide various communication services such as telephony, video, data, messaging, broadcasts, and so on. Such networks, which are usually multiple access networks, support communications for multiple users by sharing the available network resources. Examples of such networks may be based on the Universal Mobile Telecommunications System (UMTS), a third generation (3G) mobile phone technology supported by the 3rd Generation Partnership Project (3GPP). One example is the UMTS Terrestrial Radio Access Network (UTRAN), which is the successor to Global System for Mobile Communications (GSM) technologies, currently supports various air interface standards, including Time Division-Synchronous Code Division Multiple Access (TD-SCDMA), and code division multiple access (CDMA) or one of its variants such as Wideband-Code Division Multiple Access (W-CDMA). UMTS also supports enhanced 3G data communications protocols, such as High Speed Packet Access (HSPA), which provides higher data transfer speeds and capacity to associated UMTS networks.

Certain wireless networks identify subscribed users by means of a subscriber identity module (SIM). Some wireless devices support multiple concurrently installed SIMs and may provide a plurality of transceivers to support concurrent active connects. In one example, a dual active device (two transceivers) may support three or more SIMs and it is possible that two traffic calls (carrier-switched and/or packet-switched) can be active at the same time. For example, a tri-SIM device may maintain GSM+W-CDMA+W-CDMA, CDMA+W-CDMA+W-CDMA or another combination of connections. In another example, a quad-SIM device may maintain CDMA+W-CDMA+W-CDMA+GSM, W-CDMA+W-CDMA+GSM+GSM or another combination of connections.

If two SIMs are active on traffic calls in a dual-active device, the remaining SIMs generally enter an out-of-service (OOS) state. After ending the traffic calls, all SIMs will try to acquire a network and then enter an idle state on the acquired networks. The redundancy associated with this method can consume a substantial amount of power for acquisition of networks for multiple SIMs, and may require significant amounts of time to enter the idle state.

SUMMARY

In an aspect, a method, a computer program product, and an apparatus are provided. The apparatus may comprise a processing circuit of the apparatus configured to establish a first traffic call associated with a first SIM using a first radio frequency (RF) chain in an access terminal, establish a second traffic call associated with a second SIM using a second RF chain in the access terminal, and acquire a first network for a subscription corresponding to the first SIM using the first RF chain after the first traffic call is terminated. A subscription corresponding to a third SIM may enter an out-of-service mode when the first and second traffic calls are established.

The apparatus may be configured to transition the subscription corresponding to the third SIM from out-of-service mode to idle mode using acquisition information inherited from the subscription corresponding to the first SIM. The third SIM and the first network may be associated with a same radio access technology (RAT) and a same network operator.

In an aspect, transitioning the subscription corresponding to the third SIM may include using the first RF chain to monitor the first network for paging messages related to the third SIM without performing network acquisition for the third SIM. The first RF chain may be used to monitor for paging messages related to the third SIM prior to establishing the first and second traffic calls. The second RF chain may be used to monitor for paging messages related to the third SIM prior to establishing the first and second traffic calls.

In an aspect, transitioning the subscription corresponding to the third SIM may include using the second RF chain to monitor the first network for paging messages related to the third SIM without performing network acquisition for the third SIM. The first RF chain may be used to monitor for paging messages related to the third SIM prior to establishing the first and second traffic calls. The second RF chain may be used to monitor for paging messages related to the third SIM prior to establishing the first and second traffic calls.

In an aspect, transitioning the subscription corresponding to the third SIM may include maintaining acquisition information associating each of a plurality of SIMs with corresponding RAT and network operator identifications. The subscription corresponding to the third SIM may be transitioned directly to idle mode when acquisition information corresponding to the third SIM matches acquisition information corresponding to the first SIM.

In an aspect, network acquisition may be initiated if acquisition information corresponding to the third SIM does not match acquisition information corresponding to the first SIM and the acquisition information corresponding to the third SIM does not match acquisition information corresponding to a second network acquired using the first or second RF chains. The acquisition information may comprise one or more of an absolute radio-frequency channel number, a public land mobile network identifier, a cell identifier and a sector identifier. The acquisition information may comprise a timestamp. The acquisition information may be maintained for a predefined period of time.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

A system, a method and an apparatus are described. The apparatus may comprise a multi-SIM, multi-access wireless telephony device that is adapted or configured to optimize acquisitions by sharing network acquisition information.

Figure 1:
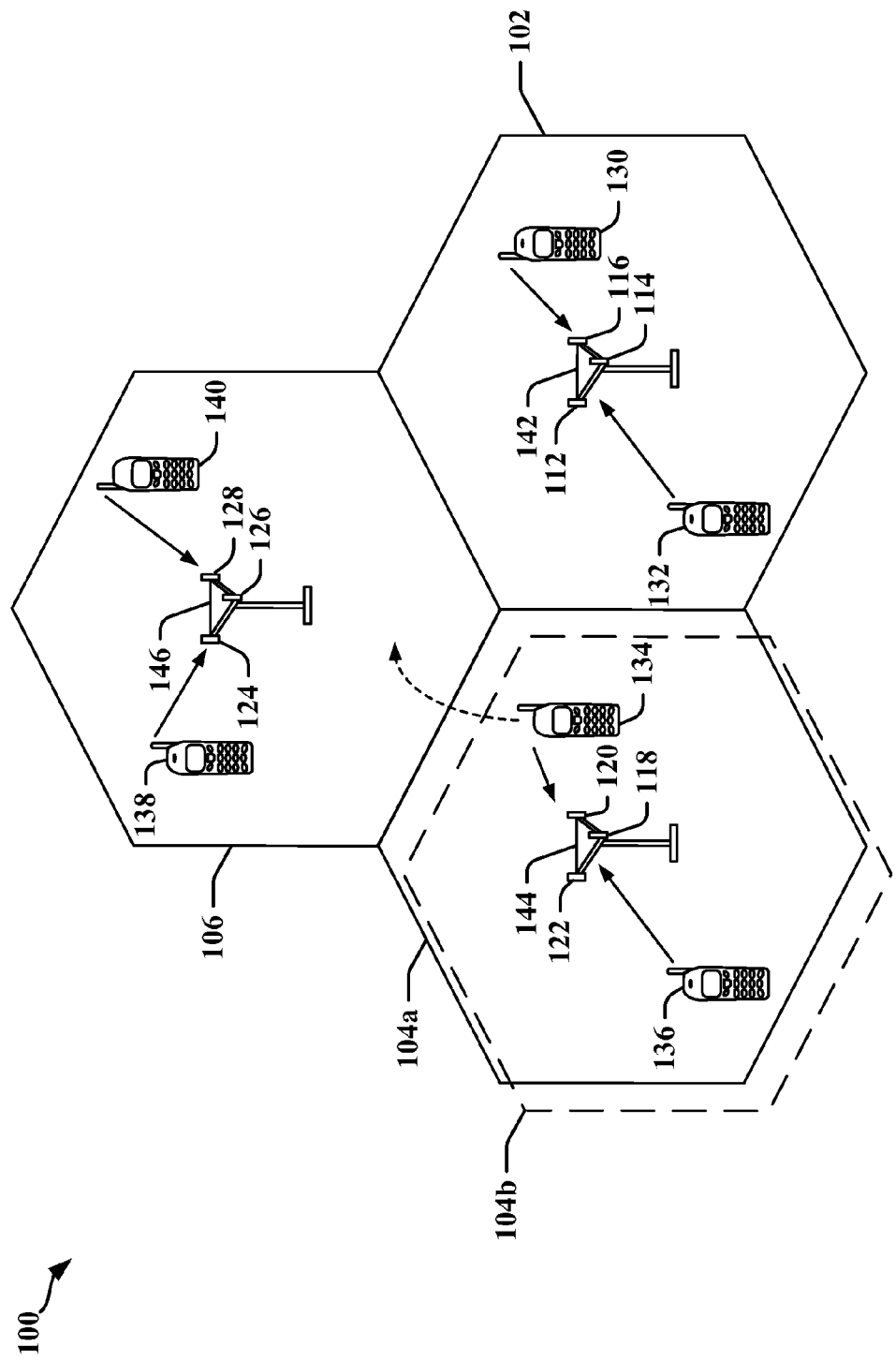
FIG. 1 is a simplified schematic illustrating an example of a radio access network.

FIG. 1 is a simplified schematic illustrating a radio access network (RAN) 100 in a UTRAN architecture. The RAN 100 includes multiple cellular regions (cells), including cells 102, 104a, and 106, each of which may include one or more sectors. Cells may be defined geographically by coverage area, and/or may be defined in accordance with a frequency, scrambling code, etc. That is, the illustrated geographically-defined cells 102, 104a, and 106 may each be further divided into a plurality of cells, through the use of different scrambling codes, for example. In one example, cell 104a may utilize a first scrambling code, and cell 104b, while in the same geographic region and served by the same Node B 144 (i.e., base station), may be distinguished by utilizing a second scrambling code.

In a cell that is divided into sectors, the multiple sectors within a cell can be formed by groups of antennas with each antenna responsible for communication with one or more access terminals in a portion of the cell. An access terminal may be referred to as user equipment (UE), particularly in relation to an access terminal configured to operate in networks complying or compatible with 3GPP standards. In the depicted example, antenna groups 112, 114, and 116 may each correspond to a different sector in cell 102. In cell 104a, antenna groups 118, 120, and 122 may each correspond to a different sector. In cell 106, antenna groups 124, 126, and 128 may each correspond to a different sector.

The cells 102, 104a, and 106 may include several UEs that may be in communication with one or more sectors of each cell 102, 104a, or 106. For example, UEs 130 and 132 may be in communication with Node B 142, UEs 134 and 136 may be in communication with Node B 144, and UEs 138 and 140 may be in communication with Node B 146. Here, each Node B 142, 144, and 146 may be configured to provide an access point to a core network 204 (see FIG. 2) for all the UEs 130, 132, 134, 136, 138, and 140 in the respective cells 102, 104a, and 106.

During a call with a source cell, or at any other time, the UE 136 may monitor various parameters of the source cell as well as various parameters of neighboring cells. Further, depending on the quality of these parameters, the UE 136 may maintain communication with one or more of the neighboring cells. During this time, the UE 136 may maintain an Active Set, that is, a list of cells to which the UE 136 is simultaneously connected (i.e., the UTRAN cells that are currently assigning a downlink dedicated physical channel (DPCH) or fractional downlink dedicated physical channel (F-DPCH) to the UE 136 may constitute the Active Set).

Figure 2:
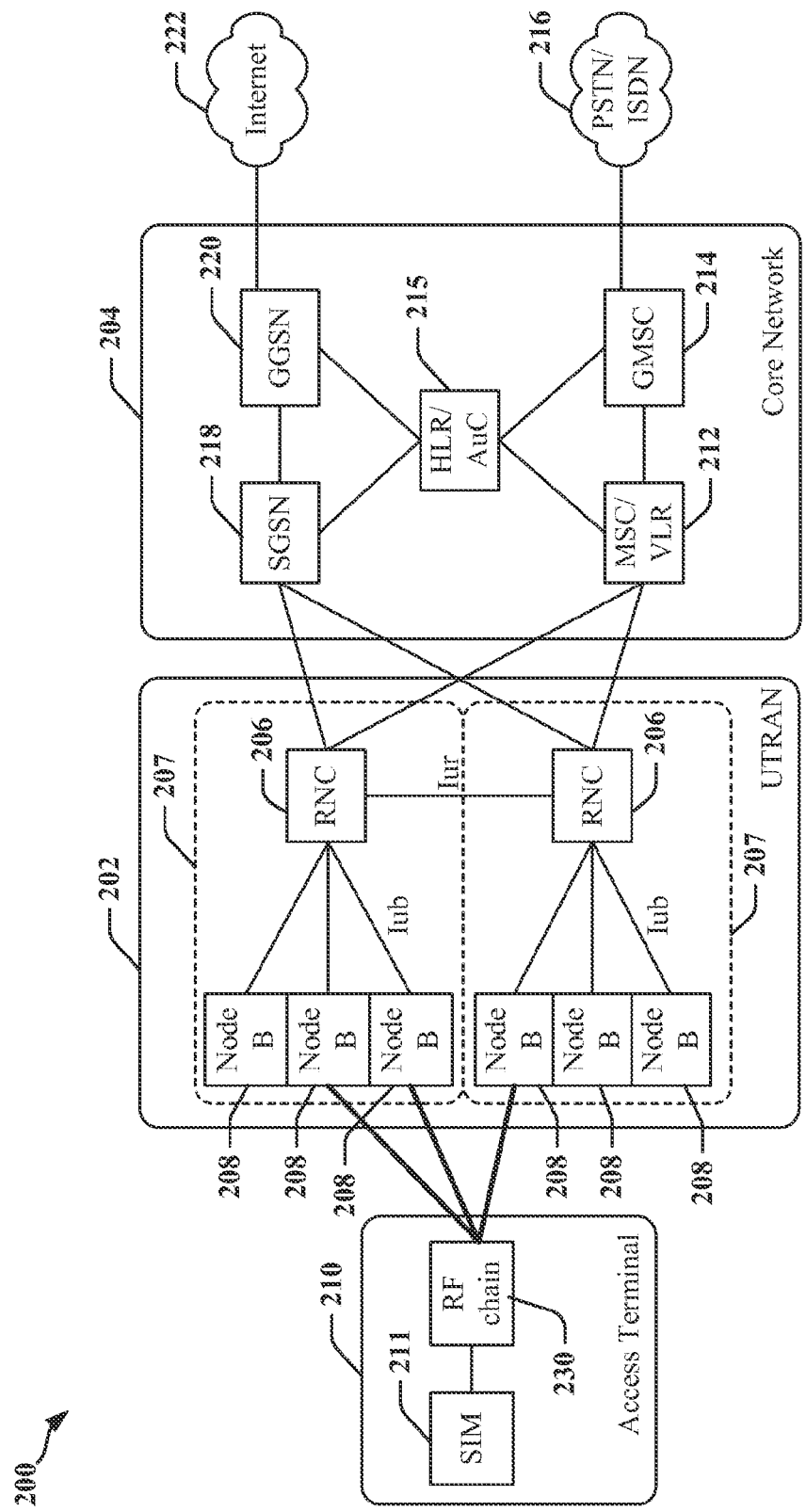
FIG. 2 is a simplified schematic depicting certain elements of networking environment based on UMTS.

FIG. 2 is a schematic 200 illustrating a UMTS RAN according to certain aspects of the present disclosure. A UMTS network includes three interacting domains: a core network 204, a RAN, and an access terminal 210. The RAN may comprise the UTRAN 202). In the depicted example, the UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. The UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell, which may be referred to as a "Node B" in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses (i.e., access terminals). Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the access terminal 210 may further include one or more universal subscriber identity modules (USIM) 211, which contains a user's subscription information to a network. For illustrative purposes, one UE (i.e., the access terminal 210) is shown in communication with a number of the Node Bs 208 via its RF chain element 230. The downlink (DL), also called the forward link, refers to the communication link from a Node B 208 to a UE (i.e., the access terminal 210) and the uplink (UL), also called the reverse link, refers to the communication link from a UE (i.e., the access terminal 210) to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs (i.e., the access terminal 210) with packet-based network connectivity. Data packets may be transferred between the GGSN 220 and the UEs (i.e., the access terminal 210) through the SGSN 218, which performs primarily the same functions in the packet-based domain as the MSC 212 performs in the circuit-switched domain.

Figure 3:
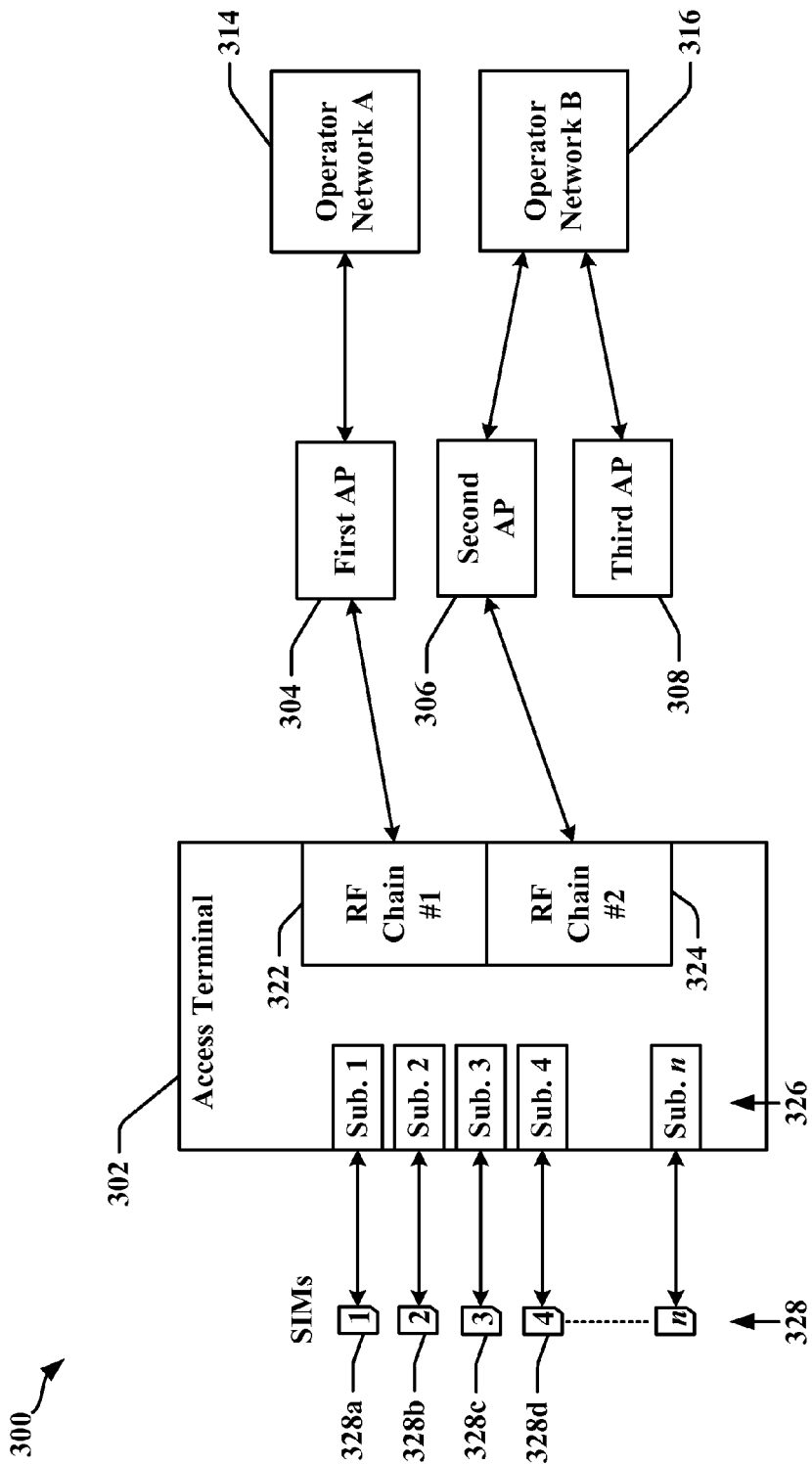
FIG. 3 is a diagram illustrating a networking environment in which a multi-SIM wireless access terminal supports multiple concurrent connections.

FIG. 3 is a diagram 300 illustrating an access terminal 302 adapted to operate concurrently in multiple distinct RANs. The access terminal 302 may comprise a cellular phone, a smart phone, a SIP phone, a laptop computer, a PDA, a satellite radio, a global positioning system, a multimedia device, a video or audio streaming device, a video device, a digital audio player, a camera, a game console, a tablet, or any other similarly functioning device. As noted herein, an access terminal 302 may also be referred to as a mobile device, a mobile terminal, a wireless terminal, a remote terminal, a wireless terminal, user equipment, a user agent, a wireless device, a wireless communications device, a mobile station, a subscriber station, a handset, a mobile client, a wireless client, or some other suitable terminology.

The access terminal 302 may be configurable to access a plurality of RANs implemented using any suitable RAT defined, for example, by telecommunication standards. Standards may be promulgated by entities such as 3GPP, the Institute of Electrical and Electronics Engineers (IEEE), among others. By way of example, one or more RANs may be operated by the same network operator or by different network operators, and may comprise one or more of: UTRAN, GSM, Long Term Evolution (LTE) which is a set of enhancements to the Universal Mobile Telecommunications System (UMTS), and Evolved UTRA Network (E-UTRAN), IEEE 802.11 (Wi-Fi), IEEE 802.16 (WiMAX), IEEE 802.20, and Fast Low-Latency Access With Seamless Handoff Orthogonal Frequency Division Multiplexing (Flash-OFDM) employing Orthogonal Frequency-Division Multiple Access (OFDMA). RANs may also comprise one or more of Evolution-Data Optimized (EV-DO) or Ultra Mobile Broadband (UMB).

The access terminal 302 may communicate with one or more access points 304, 306 and/or 308. Access points 304, 306 and 308 may comprise, or be referred to, as base stations, base transceiver stations, radio access points, access stations, radio transceivers, basic service sets, extended service sets, a Node B, an evolved Node B, or some other suitable terminology. Two or more of the access points 304, 306, 308 may provide services from the same operator network 314, 316. As depicted in FIG. 3, the access terminal 302 may obtain services from a first operator network 314 through a first access point 304 and may obtain services from a second operator network 316 through a second access point 306 or a third access point 308. In the depicted example, the access terminal 302 is connected to the second access point 306 to obtain services from the second operator network 316.

The access terminal 302 may comprise two or more RF chains 322 and 324. Each RF chain 322, 324 is typically coupled to an antenna and may include one or more transceivers, encoders, decoders, multiplexers, demultiplexers, amplifiers and signal processors that enable the access terminal to communicate wirelessly with an access point 304, 306, 308.

The access terminal 302 may be adapted or configured to support two or more SIMs 328 that can be used to identify and authenticate subscribed users of the different services offered by the operator networks 314, 316. In one example, each of the SIMs 328 may store an international mobile subscriber identity (IMSI) and related keys that can uniquely identify and authenticate a user of the access terminal 302 and services of which the user is subscriber. Accordingly, each of the SIMs 328 may be associated with a telephone number or other network identifier different from telephone numbers or other identifiers associated with the other SIMs 328. In one example, when a mobile telephone, the access terminal 302 may carry two or more SIM cards (e.g., the SIMs 328) that enable the establishment of calls on different voice and/or data networks, and to maintain concurrent active calls, provided sufficient RF chains 322 and 324 are available to support the concurrent active calls. The use of multiple SIM cards (e.g., the SIMs 328) may permit a user of the access terminal 302 to access and use features of different subscriptions to reduce costs, obtain superior service, etc.

The access terminal 302 may comprise one or more modules and/or circuits 326, each configured to interface with a corresponding one of the SIMs 328 and to manage and maintain information subscription information for that SIM in accordance with an operational mode of the access terminal 302. The access terminal 302 may support a variety of multiple SIM operational modes. For example, in dual SIM standby (DSS) mode, the access terminal may initially be in standby mode for two different subscriptions. After establishing a call through one access point 304, 306 or 308, the access terminal 302 may cause the connection between the access terminal 302 and the other access points 304, 306, 308 to enter an inactive state.

In dual SIM dual active (DSDA) mode, the access terminal 302 may be connected to two different access points 304, 306, 308 concurrently. A DSDA-enabled access terminal 302 may be capable of switching between two active calls and/or connecting two active calls at the access terminal 302. In DSDA mode the access terminal 302 may establish a first active call through one access point 304, 306, or 308, while remaining idle through another access point 304, 306, or 308. While a call is active through a first access point 304, 306, or 308, the DSDA-enabled access terminal 302 may receive a second call through a second access point 304, 306, or 308. If calls are active using the first and second access points 304, 306, or 308, a user may switch between the two calls as desired, and/or may connect the two calls at the access terminal 302.

The DSDA-enabled access terminal 302 may comprise a plurality of RF chains, each having an RF transceiver that may be assigned to an active connection. The transceivers may be embodied in one or more RF modems. An RF modem may comprise one or more transceivers having at least one power amplifier (PA), one or more processors, non-transitory storage and logic configured to process, transmit and receive signals, and to encode and decode data transmitted and received by the access terminal 302.

In triple SIM dual active (TSDA) mode, the access terminal 302 may support three subscriptions, but can be connected to only two different access points 304, 306, 308 concurrently. Typically, TDSA mode is adopted when the access terminal 302 is provided with only two RF chains 322 and 324 in order to optimize power consumption of the access terminal 302.

In quad SIM dual active (QSDA) mode, the access terminal 302 may support four subscriptions but can be connected to only two different access points 304, 306, 308 concurrently. The QDSA-enabled access terminal 302 may be provided with only two RF chains 322 and 324 in order to optimize power consumption of the access terminal 302.

In certain embodiments, the access terminal 302 may support multiple SIMs 328, which can effectively share access to two RF chains 322 and 324. When the access terminal 302 supports TSDA and/or QSDA modes, it is possible that two traffic calls may be concurrently active while a third connection is idle. The access terminal 302 may support various combinations of active and idle calls and may comprise some combination of circuit-switched (CS) and packet switched (PS) calls. In one example, the access terminal 302 may be operating in TSDA mode and may support combinations such as GSM+W-CDMA+W-CDMA, CDMA+W-CDMA+W-CDMA, etc. In another example, the access terminal 302 may be operating in QSDA mode and may support a variety of combinations, including CDMA+W-CDMA+W-CDMA+GSM, W-CDMA+W-CDMA+GSM+GSM, etc.

In some circumstances, all RF chains 322 and 324 may be busy on active voice or data connections (traffic calls). In one example, traffic calls may be established for subscriptions associated with two of the SIMs 328 and may occupy both RF chains 322 and 324 of access terminal 302. Consequently, connections associated with the remaining SIMs 328 may be in an out of service (OOS) mode. In a conventional network, the access terminal 302 may attempt to acquire respective networks terminal for the subscriptions corresponding to all of the SIMs 328 after a traffic call ends. One or more subscriptions may then be placed in idle mode. When two or more subscriptions are connected through the same RAN, the acquisition process may result in increased power consumption at the access terminal 302 and the time required for each subscription to enter idle mode may be significantly increased.

Certain embodiments described herein enable the multi-SIM dual active access terminal 302 to perform fast network acquisition and transitions to idle mode by inheriting the RAT properties between two or more SIMs 328, when the two or more SIMs 328 are associated with the same operator network. For the purposes of this description, examples will be described that employ W-CDMA, GSM and CDMA technologies, although other combinations are contemplated.

Figure 4:
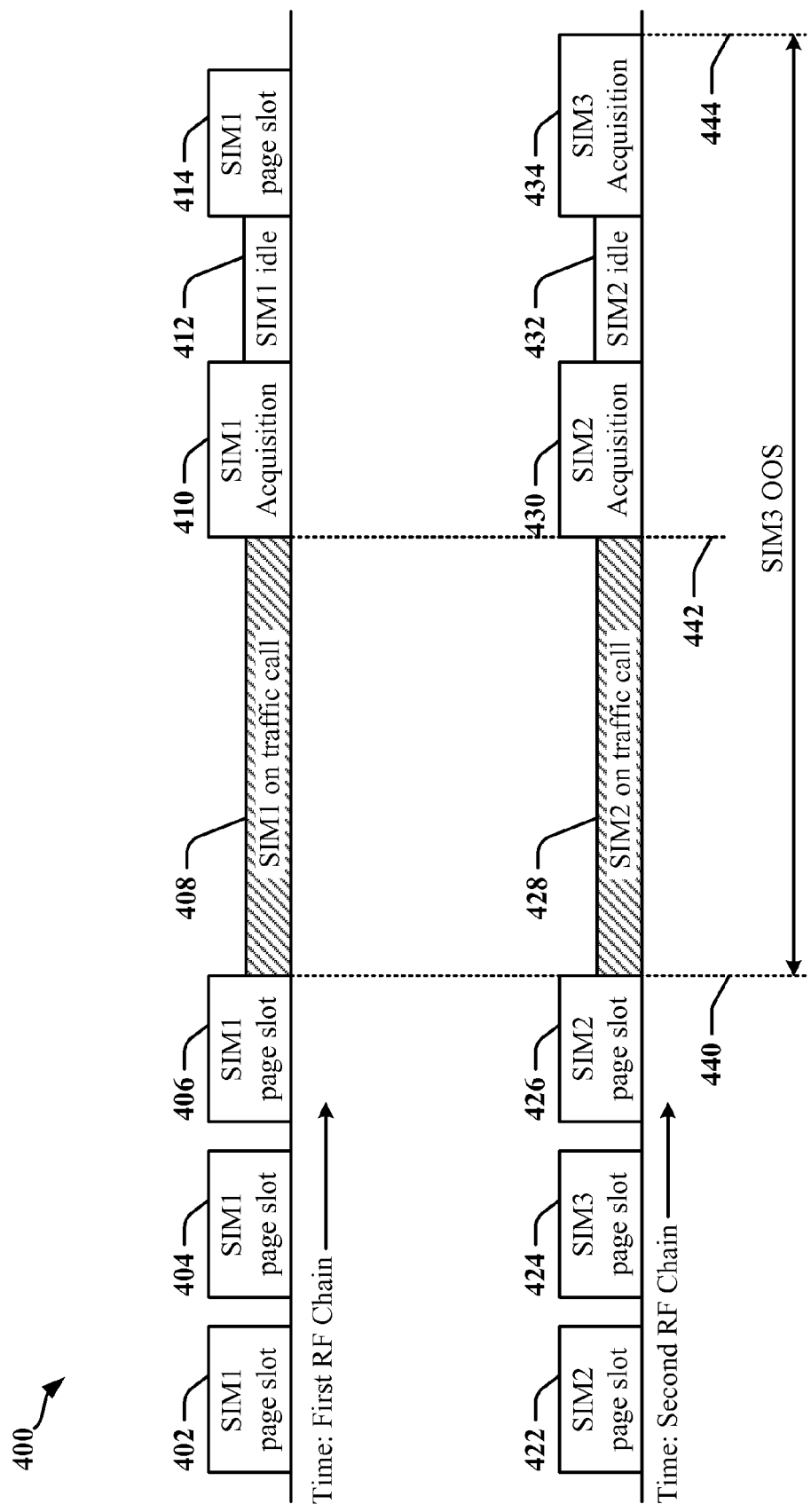
FIG. 4 is a timing diagram illustrating the operation of a multi-SIM dual-access wireless access terminal.

FIG. 4 illustrates an example 400 of fast network acquisition according to certain aspects of this disclosure. In the example, access terminal 302 is in TSDA mode. In the example, a first SIM (SIM1 328a) corresponds to a first subscription, and employs a first RF chain 322 of the access terminal 302 to establish and maintain wireless connections related to the first subscription. While in idle mode, the access terminal 302 may be paged in a plurality of paging slots 402, 404, 406, and 414 for the first subscription. In paging slot 406, for example, access terminal 302 may be notified that a call is to be established. In the example, a call 408 is established for the first subscription at time 440.

A second SIM (SIM2 328b) and a third SIM (SIM3 328c) may correspond to second and third subscriptions, respectively, and the access terminal 302 may assign a second RF chain 324 to establish and maintain wireless connections for both the second and third subscriptions. Access terminal 302 may be paged for the second and third subscriptions during alternating paging slots 422, 424, and 426. In the example depicted, the access terminal 302 may be notified during paging slot 426 that a call is to be established for the second subscription, and a call 428 may be established for the second subscription at time 440.

In the illustrative example 400 in FIG. 4, the first and second subscriptions, corresponding to the first and second SIMs (SIM1 328a and SIM2 328b) respectively, are moved to traffic call states at time 440. The call 408 related to the first subscription is assigned a first RF chain 322 while the call 428 related to the second subscription is assigned to a second RF chain 324. The subscription corresponding to SIM3 328c may enter an out-of-service (OOS) state at time 440 because no RF chain 322 or 324 is available. A plurality of subscriptions may be rendered OOS when both RF chains 322 and 324 are assigned for active calls. For example, if the access terminal supports a fourth SIM (SIM4 328d), in QSDA mode for example, then the subscription corresponding to SIM4 328d may be in OOS state for at least the time that the RF chains 322 and 324 are occupied with traffic calls 408 and 428.

At some time 442, the traffic calls 408 and 428 are terminated. To simplify description, the illustrated example 400 depicts a common termination time 442 for calls 408 and 428, although it can be expected that traffic calls 408 and 428 may be terminated at different times. In conventional systems, the access terminal 302 may attempt to acquire the network on behalf of all subscriptions that are not actively on a call when an RF chain 322 or 324 becomes available. In the depicted example 400, the access terminal 302 may attempt to acquire a network on behalf of the subscriptions corresponding to SIM1 328a, SIM2 328b and SIM3 328c. The access terminal 302 may acquire a network for SIM1 328a at acquisition time period 410 that is followed by an idle mode 412, and for SIM2 328b at acquisition time period 430 that is followed by an idle mode 432 and a paging slot 414. The access terminal 302 may acquire a network by finding an absolute radio-frequency channel number (ARFCN), matching primary synchronization code (PSC) and secondary synchronization code (SSC), after which system information may be decoded before the access terminal 302 enters idle mode for the related subscription. The process of acquiring networks for each of a plurality of subscriptions may be prolonged and involve increased power consumption when multiple SIMs 328 are installed in the access terminal 302. Also as shown in FIG. 4, the access terminal 302 may attempt to acquire a network during a time period 434 for the third subscription and SIM3 328c prior to a certain time 444 after the idle mode 432 related to SIM2 328b.

According to certain aspects disclosed herein, the number of network acquisitions performed by the multi-SIM access terminal 302 may be reduced by sharing acquisition information. The network acquisition process for certain subscriptions may be accelerated when a target network has already been acquired by the access terminal 302 on behalf of another subscription. For example, before the access terminal 302 attempts to acquire a network on behalf of a first subscription associated with a first SIM 328, the access terminal 302 may determine whether a second subscription is already associated with the RAT and the network operator corresponding to the target network to be acquired. If a second subscription is identified as having acquired the target network, then the access terminal 302 may employ the acquisition properties of the second subscription to enable the first subscription to proceed directly to idle mode.

In another example, one or more subscriptions may be in OOS state while the RF chains 322, 324 are unavailable due to dual active traffic calls 408 and 428. Upon termination of one of the calls, the access terminal 302 may attempt to acquire the freed RF chain 322 or 324 on behalf of the one or more OOS subscriptions. The access terminal 302 may suspend network acquisition attempts on behalf of a first subscription if the access terminal 302 determines that a second subscription associated with the same RAT and the same network operator is attempting to acquire the same freed RF chain 322 or 324. After successful network acquisition, the first subscription and other subscriptions associated with the same RAT and the same network operator can directly inherit acquisition properties from the second subscription and enter idle state directly.

In some embodiments, an access terminal 302 may maintain acquisition information associating subscriptions corresponding to one or more SIMs 328 installed in the access terminal 302 together with current and/or preferred RAT and network operator identifications. The access terminal 302 may then determine possibilities for inheriting acquisition property from such information. In one example, the acquisition information may include one or more of an absolute radio-frequency channel number (ARFCN), public land mobile network (PLMN) identity, a cell/sector identifier (Cell ID) and a timestamp. The timestamp may be used to age stored records of associations between subscriptions, RATs and network operators. The acquisition information and other information relating ARFCNs, Cell IDs, PLMN identities, subscriptions and SIMs 328 may be stored for a predefined period of time by the access terminal 302.

Figure 5:
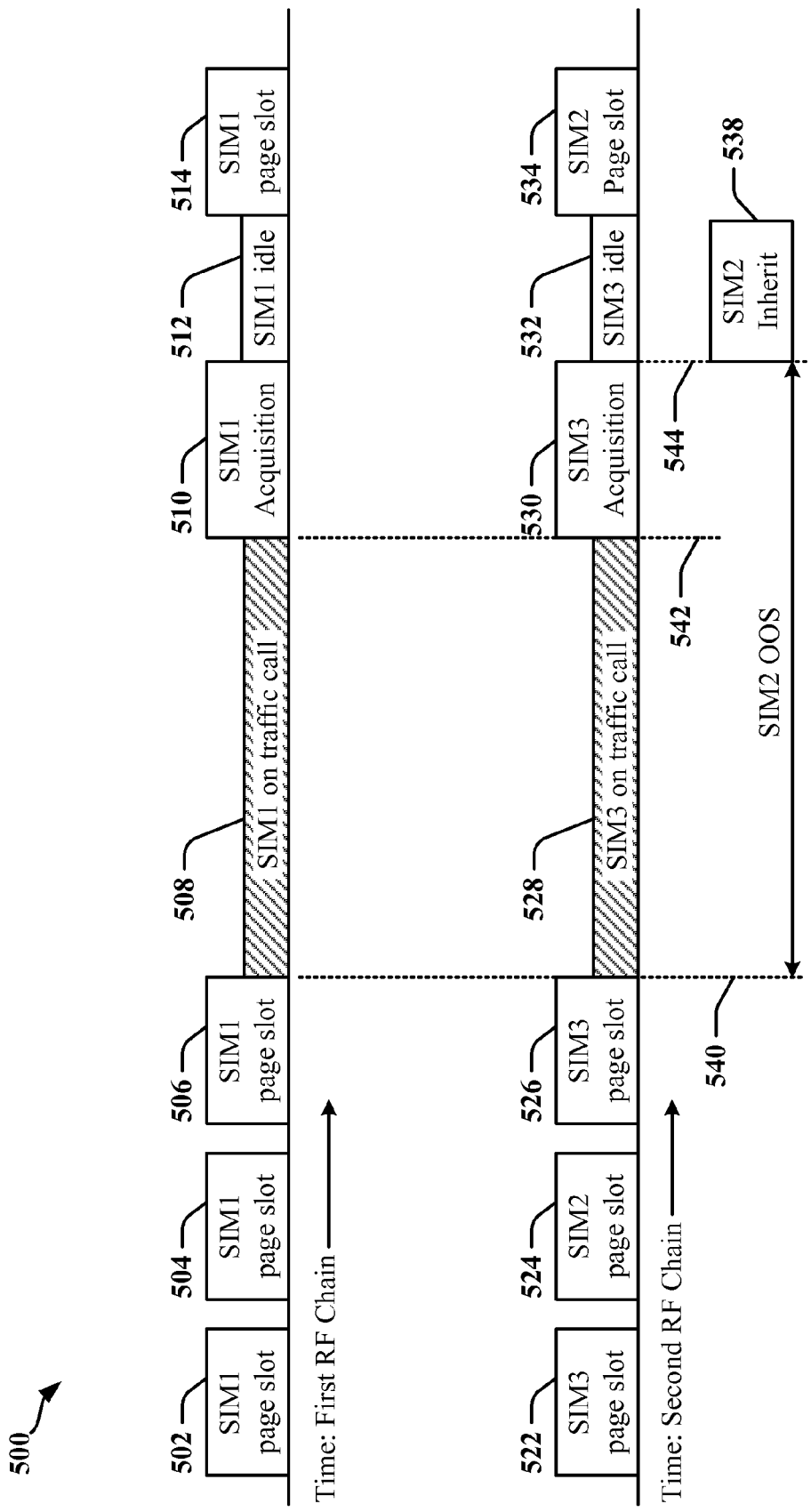
FIG. 5 is a timing diagram illustrating one example of fast acquisition in a multi-SIM dual-access wireless access terminal according to certain aspects of the disclosure.

FIG. 5 illustrates an example 500 of fast network acquisition according to certain aspects. In the illustrated example, the access terminal 302 is operating in TSDA mode, QSDA, or other multi-SIM multi-active mode. The access terminal 302 has acquired a network on first RF chain 322 for a first subscription associated with SIM1 328a, and has acquired one or more networks on second RF chain 324 for second and third subscriptions associated with SIM2 328b and SIM3 328c, respectively. In one example, SIM2 328b and SIM3 328c may be associated with the same network operator. The access terminal 302 may receive pages directed to the first subscription in paging slots 502, 504, and 506, and the access terminal 302 may receive pages in paging slot 524 for the second subscription and pages for the third subscription in paging slots 522 and 526.

In the example, the first and third subscriptions are engaged in traffic calls 508 and 528 respectively, which commence at time 540 and terminate at time 542 for the purposes of this description. The first subscription may continue to use the first RF chain 322 after terminating call 508. The access terminal 302 may acquire a first network for the first subscription during time period 510 and the first subscription may enter idle mode 512 after acquiring the first network. The access terminal 302 may continue to receive pages in paging slot 514 and subsequent paging slots.

After termination of call 528, the access terminal 302 may determine which of the second and third subscriptions should control the second RF chain 324 when the first subscription has taken control of the first RF chain 322. In one example, the third subscription may retain control of the second RF chain 324 after terminating call 528 and the access terminal 302 may attempt to acquire a network during a time period 530 for the third subscription. Upon acquiring the network, the third subscription may enter an idle state 532 at time 544. If the second subscription is associated with the same network operator and RAT as the third subscription, the second subscription may inherit network acquisition information 538 from the third subscription after time 544 and immediately enter an idle state or, can enter a paging state 534 as depicted.

Fast acquisition of networks may be enabled by identifying one or more subscriptions in a multi-SIM access terminal 302 that belong to the same RAT and the same operator of a network to be acquired. Related subscriptions may be identified by matching ARFCNs, Cell IDs, PLMN identities and other information stored on the SIMs 328 installed in the access terminal 302, and/or maintained by the access terminal 302 for subscriptions corresponding to the SIMs 328. Network acquisition information may be stored by the access terminal 302 for a predefined period of time.

Accordingly, one or more subscriptions may inherit network properties from another subscription that is already idle or active on a target network, when the subscriptions are associated with the same RAT and network operator. For example, SIM2 328b, SIM3 328c, and/or SIM4 328d may correspond to subscriptions that can inherit network properties from the subscription corresponding to SIM1 328a when SIM2 328b, SIM3 328c, and/or SIM4 328d are associated with the same RAT and network operator as SIM1 328a. Inheritable network properties may include PSC, location, SSC, primary scrambling code, and system information, for example. Accordingly, reduced network acquisition overhead and lower power consumption may be achieved because fewer ARFCNs need be scanned for every subscription supported by the access terminal 302.

Figure 6:
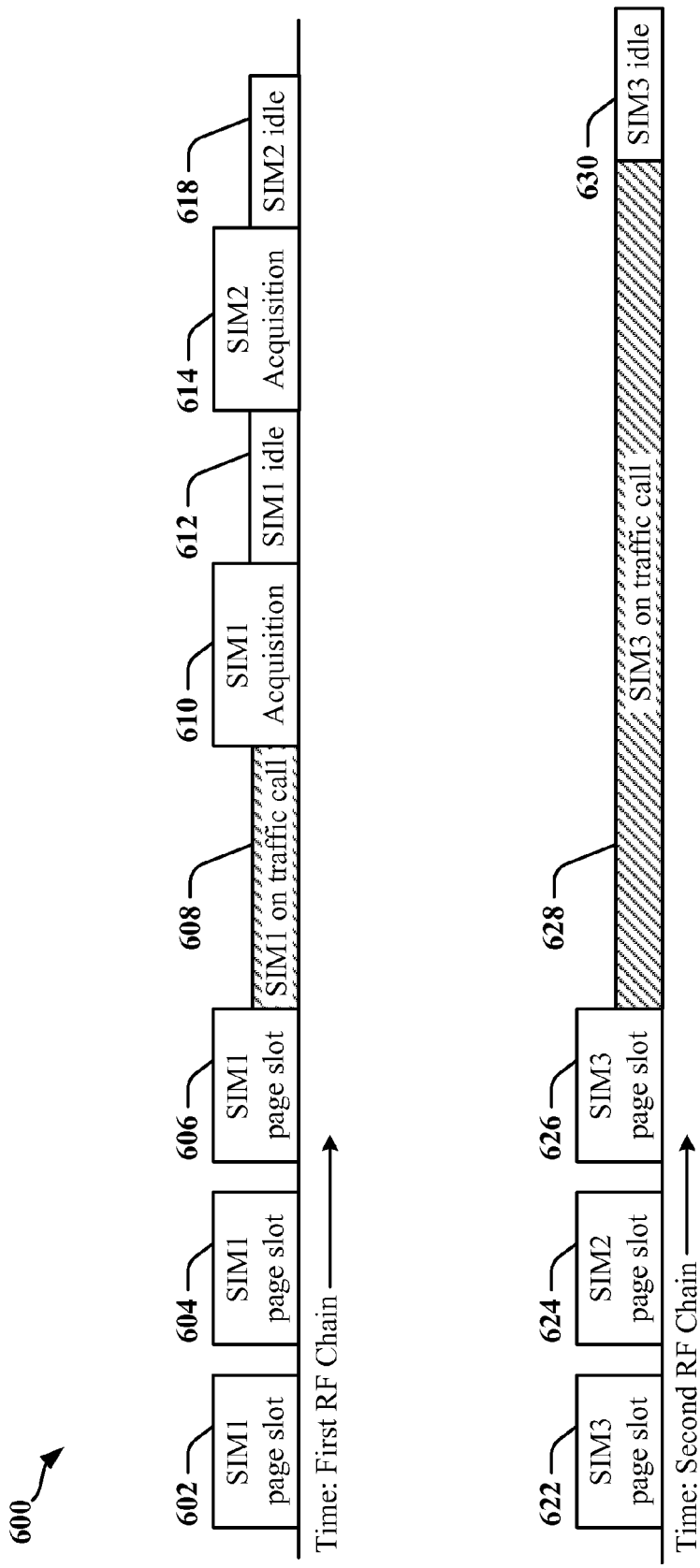
FIG. 6 is a timing diagram illustrating another example of fast acquisition in a multi-SIM dual-access wireless access terminal according to certain aspects of the disclosure.

FIG. 6 illustrates an example 600 of fast network acquisition according to certain aspects of this disclosure. In this example, access terminal 302 is operating in TSDA mode, QSDA mode, or another mode with multiple SIMs 328 and a plurality of RF chains. Here, a first subscription associated with SIM1 328a is operating on first RF chain 322, while second and third subscriptions associated with SIM2 328b and SIM3 328c are operating on the second RF chain 324. SIM2 328b and SIM3 328c may be associated with the same network operator. The access terminal 302 may receive pages for the first subscription in paging slots 602, 604, and 606, pages for the second subscription in paging slot 624 and pages for the third subscription in paging slots 622 and 626. In the example, the first and third subscriptions become concurrently active on traffic calls 608, 628, of which the first subscription call 608 terminates before the third subscription call 628. The first subscription continues to use RF chain 322 after call 608 is terminated and access terminal 302 may acquire a network associated with the first subscription during time period 610. The first subscription may enter idle mode 612 after acquisition and the access terminal 302 may then receive pages for the first subscription in subsequent paging slots (not shown).

While the third subscription is active on call 628, the second RF chain 324 is unavailable. However, the first RF chain 322 may become free when the first subscription has completed acquisition in time period 610 and has entered idle mode 612. The access terminal 302 may then assign control of the first RF chain 322 to the second subscription during first subscription idle mode state 612, and the access terminal may initiate a network acquisition during a time period 614 for the second subscription. Having acquired the network, the second subscription may enter idle mode state 618. When the third subscription call 628 terminates, the access terminal 302 may determine that network acquisition is required for the third subscription. If SIM2 328b and SIM3 328c are associated with the same RAT and network operator, the access terminal 302 may cause the third subscription to inherit the current acquisition properties of the second subscription and directly enter idle state 630.

Figure 7:
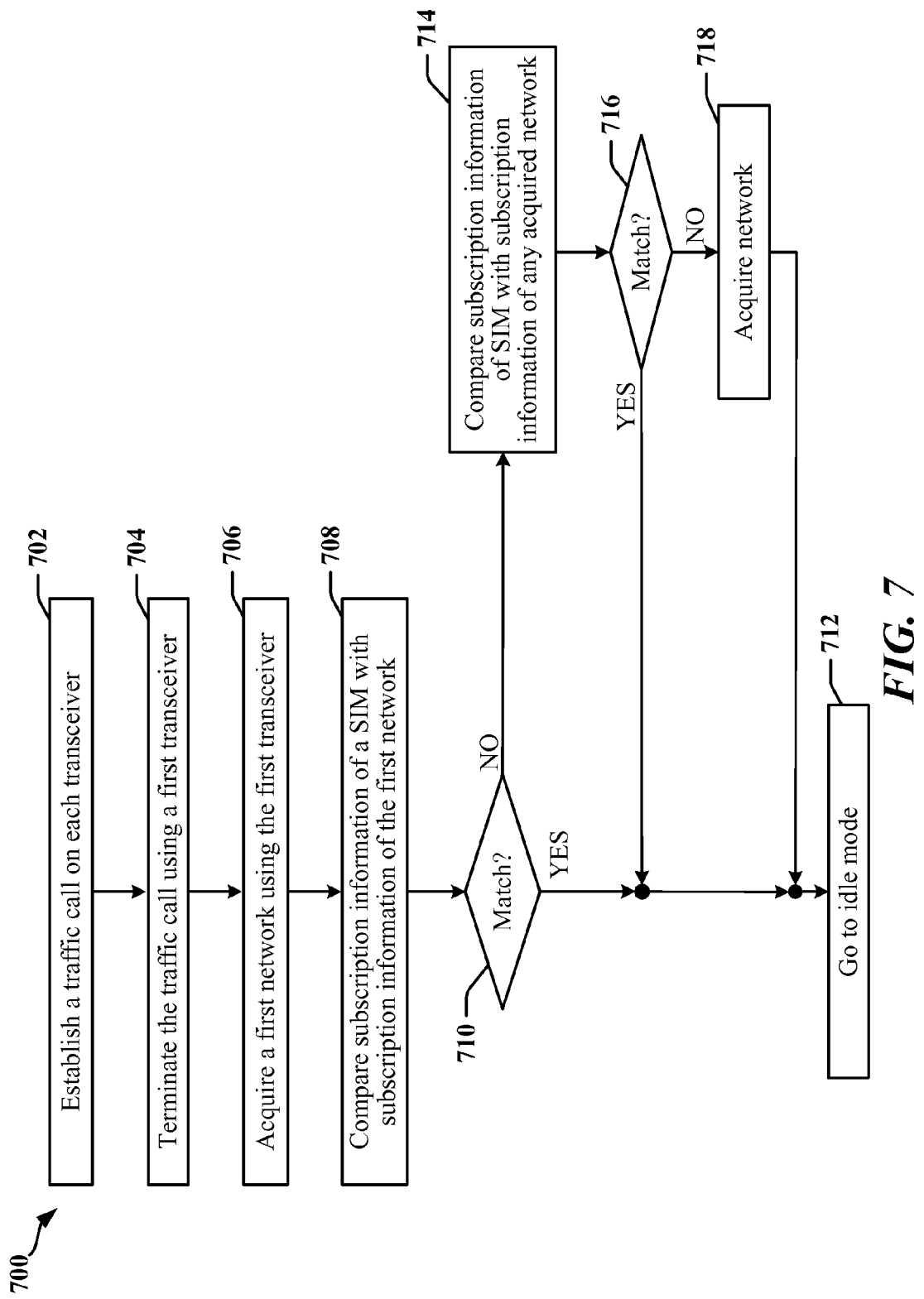
FIG. 7 is a flowchart diagram illustrating a method for fast acquisition in multi-SIM, multi-access wireless devices.

FIG. 7 is a flowchart 700 illustrating a method of wireless communication. The method may be performed by the access terminal 302. At step 702, the access terminal 302 may establish a traffic call on each transceiver, such as a traffic call associated with a first SIM 328a using a first RF chain 322 of access terminal 302. The traffic calls may be an active voice or data call.

In particular, at step 702, the access terminal 302 may establish traffic calls using a plurality of RF chains 322, 324 of the access terminal 302. A traffic call may be established on each RF chain 322 and 324 provided in the access terminal 302. In one example, the access terminal 302 comprises two RF chains 322 and 324, each RF chain 322 and 324 having at least one transceiver. A traffic call established on a first of the two available RF chains 322 or 324 may be associated with the first SIM 328a and a traffic call established on the second RF chain 324 or 322 in the access terminal 320 may be associated with a second SIM 328b. A subscription corresponding to a third SIM 328c may enter an out of service mode when the traffic calls are established using the first RF chain 322 and the second RF chain 324.

At step 704, the access terminal 302 may terminate the traffic call on the first RF chain 322. The traffic call on the second RF chain 324 may be terminated at the same time or at a later time.

At step 706, the access terminal 302 may acquire a first network using the first RF chain 322. The first network may be acquired based on a subscription associated with the first SIM. A second network may be acquired concurrently or subsequently based on a subscription associated with the second SIM 328b.

At step 708, the access terminal 302 may compare subscription information associated with the third SIM 328c with subscription information associated with the first network in order to acquire a network based on the subscription corresponding to the third SIM 328c. The subscription information associated with the first network may correspond to one or more SIMs 328.

At step 710, the access terminal 302 may determine whether a match exists between subscription information for the third SIM 328c and the first network. If a match is determined to exist, the method proceeds directly to step 712. If no match is found between the subscription information associated with the third SIM 328c with subscription information associated with the first network, the method proceeds to step 714.

At step 712, the access terminal 302 may transition the subscription corresponding to the third SIM 328c from OOS mode to idle mode using acquisition information inherited from the first network. Upon transitioning the subscription corresponding to the third SIM 328c, the access terminal 302 may use the first RF chain 322 to monitor the first network for paging messages related to the third SIM 328c.

At step 714, the access terminal 302 may compare subscription information associated with the third SIM 328c with subscription information associated with another network in order to acquire a network based on the subscription corresponding to the third SIM 328c. In one example, the other network is accessed through the second RF chain 324. In some embodiments, the access terminal 302 may maintain subscription information associating each of a plurality of SIMs 328 with current and/or preferred RAT and network operator identifications. The subscription corresponding to the third SIM 328c may be transitioned directly to idle mode when subscription information corresponding to the third SIM 328c matches subscription information corresponding to the first network. In some embodiments, subscription information comprises one or more of an absolute radio-frequency channel number, a PLMN identity, a cell identifier and a sector identifier. The subscription information may comprise a timestamp and the subscription information may be maintained for a predefined period of time.

At step 716, the access terminal 302 may determine whether a match exists between subscription information for the third SIM 328c and the other network. The first network may be associated with a RAT and a network operator corresponding to the third SIM 328c. If a match is determined to exist, the method proceeds directly to step 712 where the subscription corresponding to the third SIM 328c may be transitioned from out of service mode to idle mode using acquisition information inherited from the other network. If no match is found between the subscription information associated with the third SIM 328c with subscription information associated with any other network, the method proceeds to step 718.

At step 718, the access terminal 302 may initiate network acquisition if subscription information corresponding to the third SIM 328c does not match subscription information corresponding to the first network or a second network acquired using the second RF chain. After acquisition, the access terminal may go to idle mode at step 712.

In some embodiments, the access terminal 302 may use any one of the RF chains 322, 324 to monitor for paging messages related to the third SIM 328c after the transition of the third SIM 328c to idle mode. The access terminal 302 may have used any one of the RF chains 322, 324 to monitor for paging messages related to the third SIM 328c prior to the establishing the traffic calls using the first RF chain 322 and the second RF chain 324. In one example, the access terminal 302 may use the first RF chain 322 to monitor for paging messages related to the third SIM 328c prior to the establishing the traffic calls. In another example, the access terminal 302 may use the second RF chain 324 to monitor for paging messages related to the third SIM 328c prior to the establishing the traffic.

Figure 8:
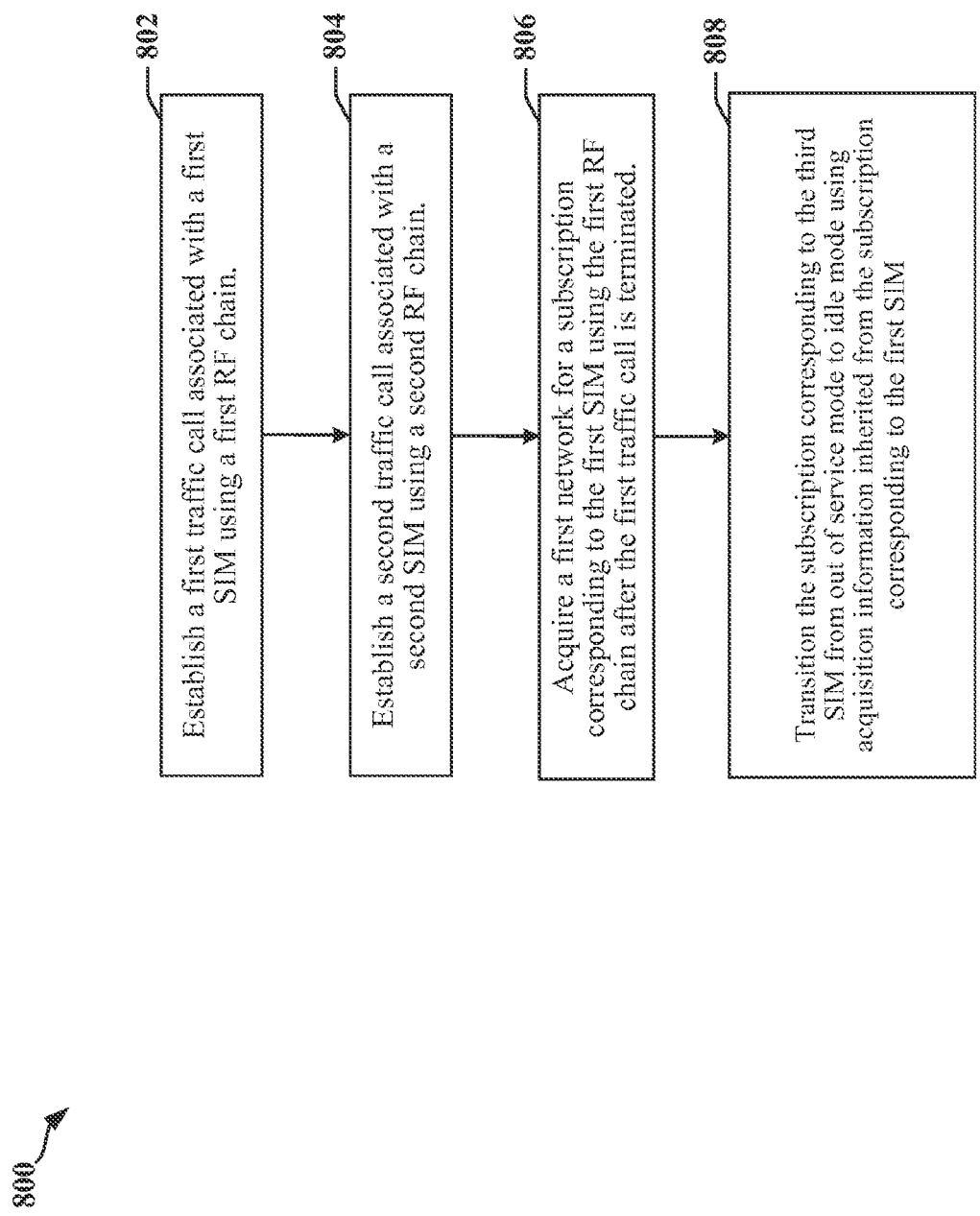
FIG. 8 is a flowchart diagram illustrating a method of fast network acquisition performed by an access terminal

FIG. 8 is a flowchart 800 illustrating a method of wireless communication. The method may be performed by an access terminal 302. At step 802, the access terminal 302 may establish a first traffic call associated with a first SIM using a first RF chain in the access terminal 302.

At step 804, the access terminal 302 may establish a second traffic call associated with a second SIM using a second RF chain in the access terminal. A subscription corresponding to a third SIM may enter an out-of-service mode when the first and second traffic calls are established.

At step 806, the access terminal 302 may acquire a first network for a subscription corresponding to the first SIM using the first RF chain after the first traffic call is terminated.

At step 808, the access terminal 302 may transition the subscription corresponding to the third SIM from out of service mode to idle mode using acquisition information inherited from the subscription corresponding to the first SIM. The third SIM and the first network may be associated with a same RAT and a same network operator. Transitioning the subscription corresponding to the third SIM may include refraining from performing network acquisition for the third SIM. Transitioning the subscription corresponding to the third SIM may include monitoring the first network for paging messages related to the third SIM using the first RF chain and the acquisition information inherited from the subscription corresponding to the first SIM. Transitioning the subscription corresponding to the third SIM may include refraining from performing network acquisition for the third SIM. Transitioning the subscription corresponding to the third SIM may include monitoring the first network for paging messages related to the third SIM using the second RF chain and the acquisition information inherited from the subscription corresponding to the first SIM.

In some embodiments, the first RF chain may be used to monitor for paging messages related to the third SIM prior to establishing the first and second traffic calls. The second RF chain may be used to monitor for paging messages related to the third SIM prior to establishing the first and second traffic calls.

In some embodiments, the first RF chain may be used to monitor for paging messages related to the third SIM prior to establishing the first and second traffic calls. The second RF chain may be used to monitor for paging messages related to the third SIM prior to establishing the first and second traffic calls.

In some embodiments, the subscription corresponding to the third SIM maybe transitioned by maintaining acquisition information associating each of a plurality of SIMs with corresponding RAT and network operator identifications. The subscription corresponding to the third SIM may be transitioned directly to idle mode when acquisition information corresponding to the third SIM matches acquisition information corresponding to the first SIM.

In some embodiments, network acquisition may be initiated if acquisition information corresponding to the third SIM does not match acquisition information corresponding to the first SIM and the acquisition information corresponding to the third SIM does not match acquisition information corresponding to a second network acquired using the first or second RF chains. The acquisition information may comprise one or more of an ARFCN, a PLMN identifier or identity, a cell identifier and a sector identifier. The acquisition information may comprise a timestamp. The acquisition information may be maintained for a predefined period of time.

Figure 9:
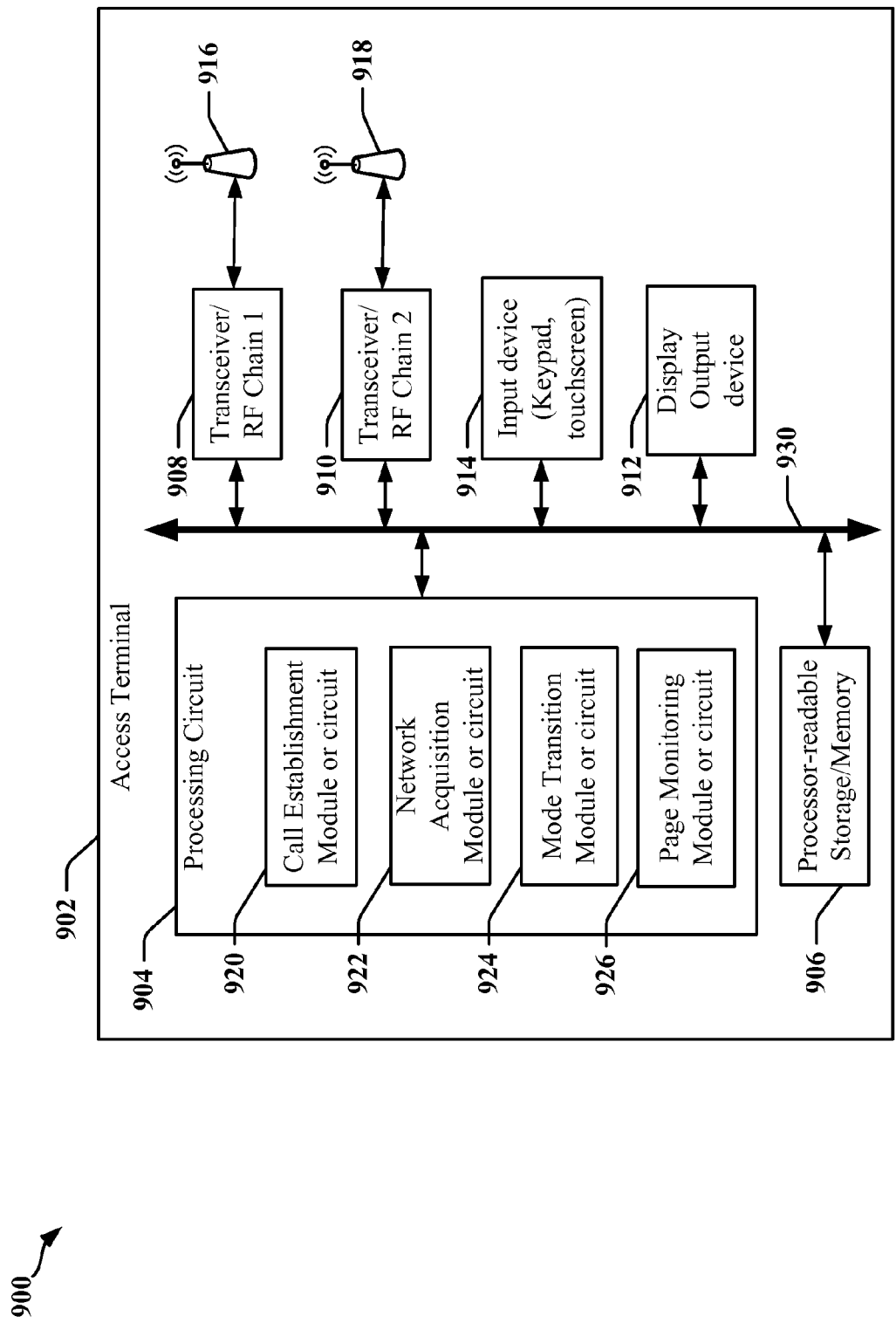
FIG. 9 is a schematic diagram illustrating an apparatus configured for fast acquisition in multi-SIM, multi-access wireless devices.

FIG. 9 is a diagram 900 illustrating an example of a hardware implementation for an apparatus 902 employing at least one processing circuit 904. The apparatus 902 may comprise an access terminal 302 as described in relation to FIG. 3. More particularly, the apparatus 902 may comprise a cellular phone, a smart phone, a SIP phone, a laptop computer, a PDA, a satellite radio, a global positioning system, a multimedia device, a video or audio streaming device, a video device, a digital audio player, a camera, a game console, a tablet, or any other similar functioning device.

The processing circuit 904 may be implemented with a bus architecture, represented generally by the bus 930. The bus 930 may include any number of interconnecting buses and bridges depending on the application and attributes of the processing circuit 904 and overall design constraints. The bus 930 may link together various circuits including one or more processors and/or hardware modules, processing circuit 904, and the non-transitory storage medium 906. The bus 930 may also link various other circuits such as timing sources, peripherals (e.g., input devices 914 such as keypads and/or touch-screens, and display output devices 912), voltage regulators, and power management circuits, which are well known in the art, and therefore, will not be described any further.

The processing circuit 904 may be coupled to one or more transceivers 908 and 910, which are configured to transmit and receive data over a wireless network. The one or more transceivers 908, 910 provide a means for communicating with various other apparatus over a transmission medium and may be used for communications within a RAN, and may provide an interface with one or more network entities. The one or more transceivers 908, 910 may be coupled to one or more antennas 916 and 918. The processing circuit 904 may include one or more processors responsible for general processing, including the execution of software stored on the non-transitory storage medium 906. Accordingly, the non-transitory storage medium may comprise some combination of computer memory, storage, or other computer-readable and/or processor-readable storage media. The software, when executed by the one or more processors, cause the processing circuit 904 to perform the various functions described supra for any particular apparatus. The non-transitory storage medium 906 may also be used for storing data that is manipulated by the processing circuit 904 when executing software. The processing system further includes at least one of the modules 920, 922, 924 and 926. The modules 920, 922, 924 and 926 may be software modules running on the processing circuit 904, resident/stored in a non-transitory computer-readable and/or processor-readable storage medium 906, one or more hardware modules coupled to the processing circuit 904, or some combination thereof. The processing circuit 904 may be a component of an access terminal 302 (see FIG. 3).

In one configuration, the apparatus 902 for wireless communication includes means 920, 908, 910, 916, 918 for establishing traffic calls on a wireless network, means 922, 908, 910, 916, 918 for acquiring a network, means 924 for transitioning a subscription out of service mode to idle mode, and means 926, 908, 910, 916, 918 for monitoring a network for paging messages.

Any implementation or aspect described herein as "exemplary" is not necessarily to be construed as preferred or advantageous over other aspects of the disclosure. Likewise, the terms "aspects" and "embodiments" do not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3 and 9 may be configured to perform one or more of the methods, features, or steps described herein. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a non-transitory storage medium may represent one or more devices for storing data, including read-only memory (ROM), random access memory (RAM), magnetic disk storage mediums, optical storage mediums, flash memory devices and/or other machine readable mediums for storing information. The terms "machine readable medium," "processor readable medium," "computer readable medium" or "machine readable storage medium" include, but are not limited to portable or fixed non-transitory storage devices, optical storage devices, and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a non-transitory machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of wireless communication, comprising:
   establishing a first traffic call associated with a first subscriber identity module (SIM) using a first radio frequency (RF) chain in an access terminal;
   establishing a second traffic call associated with a second SIM using a second RF chain in the access terminal, wherein a subscription corresponding to a third SIM enters an out-of-service mode when the first and second traffic calls are established;
   acquiring a first network for a subscription corresponding to the first SIM using the first RF chain after the first traffic call is terminated; and
   transitioning the subscription corresponding to the third SIM from out of service mode to idle mode using acquisition information inherited from the subscription corresponding to the first SIM.

2. The method of claim 1, wherein the third SIM and the first network are associated with a same radio access technology (RAT) and a same network operator.

3. The method of claim 1, wherein transitioning the subscription corresponding to the third SIM includes:
   refraining from performing network acquisition for the third SIM; and
   monitoring the first network for paging messages related to the third SIM using the first RF chain and the acquisition information inherited from the subscription corresponding to the first SIM.

4. The method of claim 1, further comprising:
   using the first RF chain to monitor for paging messages related to the third SIM prior to establishing the first and second traffic calls.

5. The method of claim 1, further comprising:
using the second RF chain to monitor for paging messages related to the third SIM prior to establishing the first and second traffic calls.

6. The method of claim 1, wherein transitioning the subscription corresponding to the third SIM includes:
refraining from performing network acquisition for the third SIM; and
monitoring the first network for paging messages related to the third SIM using the second RF chain and the acquisition information inherited from the subscription corresponding to the first SIM.

7. The method of claim 6, further comprising:
using the first RF chain to monitor for paging messages related to the third SIM prior to establishing the first and second traffic calls.

8. The method of claim 6, further comprising:
using the second RF chain to monitor for paging messages related to the third SIM prior to establishing the first and second traffic calls.

9. The method of claim 1, wherein transitioning the subscription corresponding to the third SIM includes:
maintaining acquisition information associating each of a plurality of SIMs with corresponding RAT and network operator identifications,
wherein the subscription corresponding to the third SIM is transitioned directly to idle mode when acquisition information corresponding to the third SIM matches acquisition information corresponding to the first SIM.

10. The method of claim 9, further comprising:
initiating network acquisition if the acquisition information corresponding to the third SIM does not match the acquisition information corresponding to the first SIM and the acquisition information corresponding to the third SIM does not match acquisition information corresponding to a second network acquired using the first or second RF chains.

11. The method of claim 9, wherein the acquisition information comprises one or more of an absolute radio-frequency channel number, a public land mobile network identifier, a cell identifier and a sector identifier.

12. The method of claim 9, wherein the acquisition information comprises a timestamp, and wherein the acquisition information is maintained for a predefined period of time.

13. An apparatus for wireless communication, comprising:
means for establishing traffic calls on a wireless network, wherein a first traffic call is associated with a first subscriber identity module (SIM) and uses a first radio frequency (RF) chain in an access terminal, and a second traffic call is associated with a second SIM and uses a second RF chain in the access terminal, and wherein a subscription corresponding to a third SIM enters an out-of-service mode when the first and second traffic calls are established;
means for acquiring a first network for a subscription corresponding to the first SIM using the first RF chain after the first traffic call is terminated; and
means for transitioning the subscription corresponding to the third SIM from out of service mode to idle mode using acquisition information inherited from the subscription corresponding to the first SIM.

14. The apparatus of claim 13, wherein the third SIM and the first network are associated with a same radio access technology (RAT) and a same network operator.

15. The apparatus of claim 13, wherein the means for transitioning the subscription is configured to refrain from performing network acquisition for the third SIM, the apparatus further comprising:
means for monitoring one or more networks for paging messages, wherein the first RF chain is used to monitor one of the one or more networks for paging messages related to the third SIM using the acquisition information inherited from the subscription corresponding to the first SIM.

16. The apparatus of claim 13, wherein the means for transitioning the subscription is configured to refrain from performing network acquisition for the third SIM, the apparatus further comprising:
means for monitoring one or more networks for paging messages, wherein the second RF chain is used to monitor one of the one or more networks for paging messages related to the third SIM using the acquisition information inherited from the subscription corresponding to the first SIM.

17. The apparatus of claim 13, further comprising:
means for monitoring one or more networks for paging messages, wherein the first RF chain is used to monitor one of the one or more networks for paging messages related to the third SIM prior to establishing the first and second traffic calls.

18. The apparatus of claim 13, further comprising:
means for monitoring one or more networks for paging messages, wherein the second RF chain is used to monitor one of the one or more networks for paging messages related to the third SIM prior to establishing the first and second traffic calls.

19. The apparatus of claim 13, wherein the means for transitioning the subscription is configured to transition the subscription corresponding to the third SIM directly to idle mode when acquisition information corresponding to the third SIM matches acquisition information corresponding to the first SIM, wherein the acquisition information corresponding to the first SIM identifies a RAT and a network operator.

20. The apparatus of claim 19, further comprising means for initiating network acquisition if the acquisition information corresponding to the third SIM does not match the acquisition information corresponding to the first SIM and the acquisition information corresponding to the third SIM does not match acquisition information corresponding to a second network acquired using the first or second RF chains.

21. The apparatus of claim 19, wherein the acquisition information comprises one or more of an absolute radio-frequency channel number, a public land mobile network identifier, a cell identifier and a sector identifier.

22. The apparatus of claim 19, wherein the acquisition information comprises a timestamp and is maintained for a predefined period of time.

23. An access terminal adapted for wireless communication, comprising:
at least one transceiver, the at least one transceiver providing a first radio frequency (RF) chain and a second RF chain;
a processing circuit configured with processor-executable instructions to perform operations comprising:
establishing a first traffic call associated with a first subscriber identity module (SIM) using the first RF chain;
establishing a second traffic call associated with a second SIM using the second RF chain, wherein a subscription corresponding to a third SIM enters an out-of-service mode when the first and second traffic calls are established;

acquiring a first network for a subscription corresponding to the first SIM using the first RF chain after the first traffic call is terminated; and transitioning the subscription corresponding to the third SIM from out of service mode to idle mode using acquisition information inherited from the subscription corresponding to the first SIM.

24. The access terminal of claim 23, wherein the third SIM and the first network are associated with a same radio access technology (RAT) and a same network operator.

25. The access terminal of claim 23, wherein the processing circuit is configured with processor-executable instructions to perform operations such that transitioning the subscription corresponding to the third SIM comprises:

refraining from performing network acquisition for the third SIM; and monitoring the first network for paging messages related to the third SIM using the acquisition information inherited from the subscription corresponding to the first SIM.

26. The access terminal of claim 23, wherein the processing circuit is configured with processor-executable instructions to perform operations further comprising using the first RF chain or the second RF chain to monitor for paging messages related to the third SIM prior to establishing the first and second traffic calls.

27. The access terminal of claim 23, wherein the processing circuit is configured with processor-executable instructions to perform operations such that transitioning the subscription corresponding to the third SIM comprises:

maintaining acquisition information associating each of a plurality of SIMs with corresponding RAT and network operator identifications; and transitioning the subscription corresponding to the third SIM directly to idle mode when acquisition information corresponding to the third SIM matches acquisition information corresponding to the first SIM.

28. The access terminal of claim 27, wherein the processing circuit is configured with processor-executable instructions to perform operations further comprising:

initiating network acquisition if the acquisition information corresponding to the third SIM does not match the acquisition information corresponding to the first SIM and the acquisition information corresponding to the third SIM does not match acquisition information corresponding to a second network acquired using the first or second RF chains.

29. The access terminal of claim 27, wherein the acquisition information comprises one or more of an absolute radio-frequency channel number, a public land mobile network identifier, a cell identifier and a sector identifier.

30. The access terminal of claim 27, wherein the acquisition information comprises a timestamp, and wherein the processing circuit is configured with processor-executable instructions to perform operations further comprising maintaining the acquisition information for a predefined period of time.

31. A non-transitory processor-readable storage medium having stored thereon processor-executable instructions which, when executed by at least one processing circuit, causes the at least one processing circuit to perform operations comprising:

establishing a first traffic call associated with a first subscriber identity module (SIM) using a first radio frequency (RF) chain of an access terminal;

establishing a second traffic call associated with a second SIM using a second RF chain of the access terminal, wherein a subscription corresponding to a third SIM enters an out-of-service mode when the first and second traffic calls are established;

acquiring a first network for a subscription corresponding to the first SIM using the first RF chain after the first traffic call is terminated; and transitioning the subscription corresponding to the third SIM from out of service mode to idle mode using acquisition information inherited from the subscription corresponding to the first SIM.

32. The non-transitory processor-readable storage medium of claim 31, wherein the third SIM and the first network are associated with a same radio access technology (RAT) and a same network operator.

33. The non-transitory processor-readable storage medium of claim 31, wherein the stored processor-executable instructions cause the at least one processing circuit to perform operations such that transitioning the subscription corresponding to the third SIM comprises:

refraining from performing network acquisition for the third SIM; and monitoring the first network for paging messages related to the third SIM using the first RF chain or the second RF chain and the acquisition information inherited from the subscription corresponding to the first SIM.

34. The non-transitory processor-readable storage medium of claim 31, wherein the stored processor-executable instructions cause the at least one processing circuit to perform operations further comprising:

using the first RF chain or the second RF chain to monitor the first network for paging messages related to the third SIM prior to establishing the first and second traffic calls.

35. The non-transitory processor-readable storage medium of claim 31, wherein the stored processor-executable instructions cause the at least one processing circuit to perform operations such that transitioning the subscription corresponding to the third SIM comprises:

maintaining acquisition information associating each of a plurality of SIMs with corresponding RAT and network operator identifications; and transitioning the subscription corresponding to the third SIM directly to idle mode when acquisition information corresponding to the third SIM matches acquisition information corresponding to the first SIM.

36. The non-transitory processor-readable storage medium of claim 35, wherein the stored processor-executable instructions cause the at least one processing circuit to perform operations further comprising:

initiating network acquisition if the acquisition information corresponding to the third SIM does not match the acquisition information corresponding to the first SIM and the acquisition information corresponding to the third SIM does not match acquisition information corresponding to a second network acquired using the first or second RF chains.

37. The non-transitory processor-readable storage medium of claim 35, wherein the acquisition information comprises one or more of an absolute radio-frequency channel number, a public land mobile network identifier, a cell identifier and a sector identifier.

38. The non-transitory processor-readable storage medium of claim 35, wherein the acquisition information comprises a timestamp, and wherein the acquisition information is maintained for a predefined period of time.

* * * * *